Nov. 10, 1925.
R. P. WHITE
1,561,198
JAR AND BAIL THEREFOR
Filed Aug. 23, 1923   2 Sheets-Sheet 1
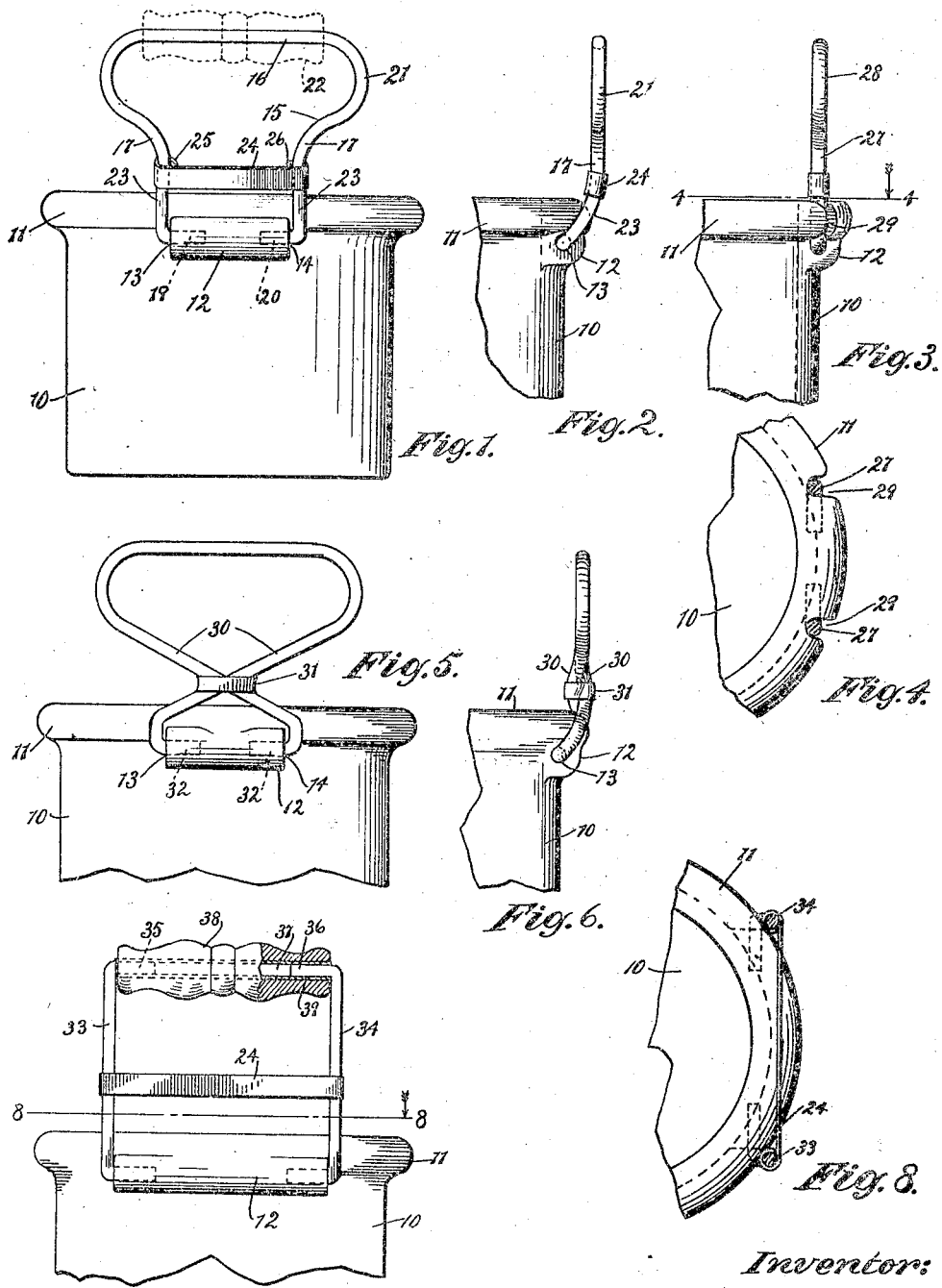
Inventor:
Richard P. White

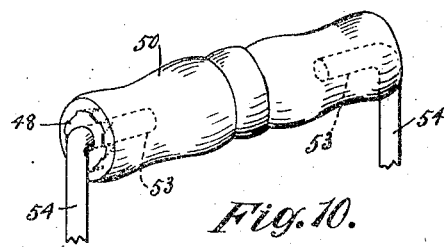
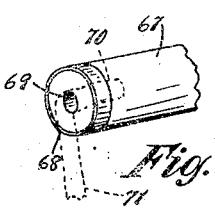
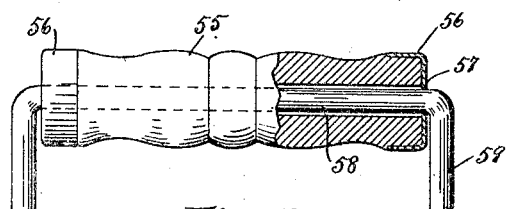
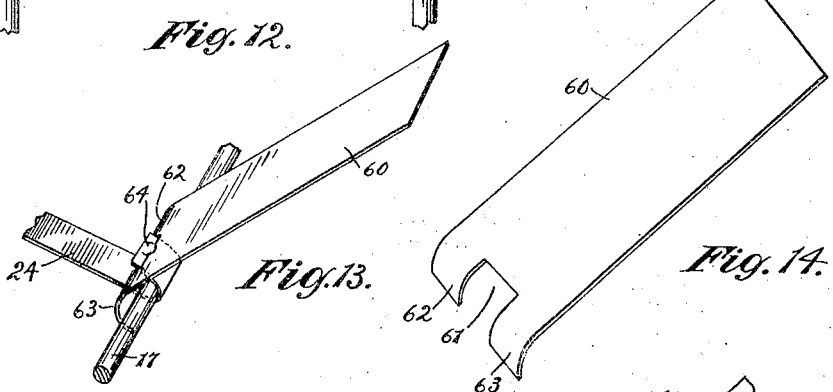
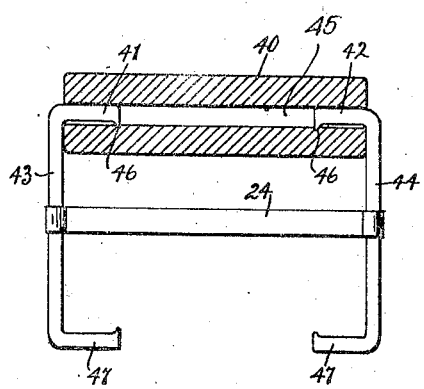

Patented Nov. 10, 1925.

1,561,198

UNITED STATES PATENT OFFICE.

RICHARD P. WHITE, OF CHICAGO, ILLINOIS.

JAR AND BAIL THEREFOR.

Application filed August 23, 1923. Serial No. 658,837.

*To all whom it may concern:*

Be it known that I, RICHARD P. WHITE, a citizen of the United States, and resident of Chicago, county of Cook, and State of Illinois, have invented certain new and useful Improvements in Jars and Bails Therefor, of which the following is a specification, and which are illustrated in the accompanying drawings, forming a part thereof.

This invention relates to improvements in jars, and more particularly to new and improved handles and means for attaching the same to stoneware vessels and the like.

One of the objects of the invention is the provision of means whereby a wire of small gauge may if desired be employed for forming the handles for earthenware and like vessels.

Another object of the invention is the provision of means for preventing the disengagement of the handles from the vessels to which they are attached without materially increasing the cost of manufacturing and assembling of parts.

A further object of the invention is the provision of means whereby the bail is attached to the lugs or ears without materially weakening the latter.

A still further object of the invention is the provision of a bail for vessels that is simple in construction, efficient in use, cheap to manufacture and assemble, and one that is not likely to become distorted or to get out of order.

Further objects and advantages of the invention will appear from the following description, taken in connection with the accompanying drawings, in which Fig. 1 is a side elevation of a jar showing the bail in position thereon;

Fig. 2 is a view at right angles thereof, with parts broken away;

Fig. 3 is a side elevation of a portion of a modified form of jar with modified form of handle attached thereto;

Fig. 4 is a section on line 4—4 of Fig. 3;

Fig. 5 is a side elevation of a portion of a jar showing a modified form of bail attached thereto;

Fig. 6 is a view at right angles to that shown in Fig. 5;

Fig. 7 is a side elevation of a portion of a jar showing a further modified form of bail;

Fig. 8 is a section on line 8—8 of Fig. 7;

Fig. 9 is a still further modified form of bail;

Fig. 10 is a perspective of a modified form of handle for the bail;

Fig. 11 is a detail of same;

Fig. 12 is a further modified form of handle element, with parts in section and parts broken away;

Fig. 13 is a perspective of a portion of the bail and tie member together with the tie attaching tool;

Fig. 14 is a perspective of the tie attaching tool; and

Fig. 15 is a perspective view of a portion of the jar and tool for forming the apertures in the ear or lug.

Fig. 16 is a modified form of the device.

On the drawing the reference character 10 designates a jar or other vessel of frangible material having the bead 11 extending about the upper or open end thereof, as is usual in such constructions. The upper end of the jar adjacent to the bead is provided with an ear or lug 12. This lug is provided at each end thereof with recesses 13 and 14 for the attachment of the bail as will presently appear. Each jar is provided with two lugs arranged diametrically opposite each other, but since the construction of the lugs and the bails is the same at each side of the jar, only one need be shown and described.

The recesses 13 and 14 may extend entirely through the lug 12, but preferably they extend only a short distance inwardly from each side thereof, whereby the central portion of the lug is not weakened by having an aperture therethrough.

In the manufacture and assembling of handles on earthenware vessels and the like, the weight and frangible nature of the material requires the use of handles that are not only strong and reliable but that are not likely to become detached while using the same in transporting the vessels on which they are employed. Furthermore, the inexpensiveness of the vessel necessitates the use of bails that will not materially increase the cost of manufacturing the article. These requirements are met and numerous other advantages obtained by the arrangement which will now be described.

Referring to Figs. 1 and 2, the reference character 15 designates the bail which comprises the handle 16, side supporting members 17 and laterally extending attaching portions 19 and 20 which are adapted to engage the recesses 13 and 14 in the ears or lugs 12.

The bail is preferably, though not necessarily, made by bending a single length of wire to form a loop 21 for the handle portion, and with the ends of the side members bent laterally to form the attaching portions 19 and 20. The handle 16 may, if desired, be provided with the usual wooden handle element 22, as shown in Fig. 1. This element is applied to the bail before the same is bent to proper position. The wooden handle element is not necessary and for cheap constructions it may be omitted, as shown in Fig. 2.

The eye or attaching lug 12 is so arranged that it does not extend beyond the outer surface of the bead 11, whereby the recesses 13 and 14 are located beneath said bead. The side supporting members 17 are bent as shown at 23 in Fig. 2 to engage about said bead to permit the handle to extend vertically.

The supporting members 17 are prevented from spreading apart and thus disengaging the ends 19 and 20 from the recesses 13 and 14 by suitable means. As shown, a tie or brace member 24 is employed for this purpose. The ends 25 and 26 of this member are bent about the supporting members 17 adjacent to the lug 12. When the tie or brace member 24 is in position it will hold the supporting member 17 adjacent to the ends of the lug 12 whereby the ends 19 and 20 of the bail will support a tremendous weight without becoming bent. In other words, the weight of the jar and its contents, when supported by the handles, will tend to shear the laterally extending ends 19 and 20 rather than bend the same.

In the modified form of the device shown in Figs. 3 and 4, the supporting members 27 are arranged in the plane of the handle 28, the bead 11 of the jar 10 being provided with recesses 29 which are adapted to receive said supporting members when they are in their upper position. By this arrangement the bail may be lowered beneath the bead in packing the jar for shipment.

In Figs. 5 and 6 is shown a modified form of the bail in which the supporting members 30 are arranged to extend across each other. A suitable tie or clamp member 31 extending about said supporting members 30 at their point of intersection is provided for preventing the disengagement of the laterally extending ends 32 from the corresponding recesses 13 and 14 in the ear 12 of the jar 10.

Under certain circumstances it may be desirable to form the bail of separate parts, and in Figs. 7 and 8 is shown a manner of accomplishing this result. In these figures the side supporting members 33 and 34 are formed separately from each other, their upper ends are bent laterally as shown at 35 and 36 and they are adapted to engage in each end of an opening 37 extending through the handle 38. The handle 38 may, if desired, be provided with a bushing 39 in which the ends 35 and 36 are journaled. The tie or brace member 24 and the arrangement of the lower ends of the bail are substantially the same as that shown in Figs. 1 and 2, except that the bail is placed nearer the handle.

The device shown in Fig. 9 differs from that shown in Figs. 7 and 8 in that the wooden handle 40 is not provided with a bushing for the reception of the upper bent ends 41 and 42 of the supporting members 43 and 44. The outer portions of the ends 41 and 42 are bent downwardly as at 46 for engaging the wall of the opening 45 to assist in supporting the weight of the vessel. The inner portions of the ends 47 may be bent upwardly for a similar reason.

In Figs. 10 and 11 is shown a still further modified form of handle in which a cap 48 provided with a central aperture 49 is secured to each end of the wooden handle element 50 to provide a bearing or wearing surface for the inturned ends 54 of the side members. The cap 48 is adapted to be secured to the wooden handle element 50 in any suitable manner, as by means of the prongs 52 which are driven into the ends of said handle.

In the form of the device shown in Fig. 12 the ends of the wooden handle element 55 are provided with ferrules 56 having central apertures 57 through which the handle portion 58 of the bail 59 is adapted to extend.

The tie or brace member 24 may be made from any suitable material of any desirable cross-section. As shown, it is rectangular in cross-section, although it is understood that so far as the function of this member is concerned it may be otherwise. The ends of the member 24 are bent or folded about the supporting portions of the handle in any suitable manner. In Fig. 14 is shown a tool for accomplishing this purpose. The tool comprises a handle 60 having a notch 61 in one end thereof forming the extensions 62 and 63 which are curved as shown in Figs. 13 and 14.

In using the tool, the curved extensions 62 and 63 are engaged with the supporting member 17 with the handle extending at right angles to the member 24 and on the same side thereof with the end of said member 24 projecting through said notch between the handle and the supporting member 17. The handle 60 is then moved in the direction to bend or wrap the end of the member 24 about the member 17. If it is desired to place the member 24 under tension so as to force the members 17 toward each other, or if it is desired that the ends of the member 24 be closely wrapped about the member 17, as when the tie member is employed as a compression instead of a tension member, one or both ends of the member 24 may be provided with a suitable projection 64 which is adapted to be engaged by the handle portion during the bending operation as shown in Fig. 13. This makes a firm connection and is especially useful when the member 24 when in use is under compression as when the lug attaching ends of the supporting members extend in opposite directions to engage individual lugs on the jar.

By the use of a tie member, a single lug with shallow recesses in each side thereof may be employed without the necessity of extending the recesses entirely through the lugs and thereby weakening the same to a more or less extent. It is understood, however, that it is immaterial so far as the function of the bail is concerned whether the recesses extend entirely or only partially through the ears or lugs, or whether one or more lugs be used.

In Fig. 15 is shown a simple device for forming the recesses in the lugs. This device comprises a handle portion 65 from which extends a wire loop 66, the diameter of the loop being substantially that of the desired recess. In forming the recesses, the wire loop 66 is inserted in the lug or ear while it is still plastic and is given a complete turn after which it is removed along with the severed material.

In the modified form of the device shown in Fig. 16, the ends of the wooden handle 67 are provided with a ring 68 which is adapted to prevent the splitting of the handle by engagement in the opening 69 thereof of the ends 70 of the bail 71.

It is thought from the foregoing taken in connection with the accompanying drawings that the construction and operation of my device will be apparent to those skilled in the art, and that various changes in size, shape, proportion and details of construction may be made without departing from the spirit and scope of the appended claim.

I claim as my invention:

In combination, a jar of frangible material, a plurality of lugs on said jar, each lug being provided with a recess at each end thereof, a carrying bail for each lug, each of said bails comprising a handle, and side portions of relatively light wire having inturned bent ends for engaging in said recesses, and a tie member for engaging said side portions for holding said ends in said recesses, said handle adapted to extend upwardly in substantially a vertical plane with the adjacent parts of said side portions, whereby when said jar is lifted by said bails the weight of the same will be supported by the tensile strength of said side portions without tending to produce a bending action therein above the tie members, thus permitting the use of relatively light wire in the formation of said bail without impairing its normal supporting function.

RICHARD P. WHITE.